Aug. 11, 1942.   L. H. REZOS   2,292,480
SANITARY MEAT HOLDER
Filed Sept. 21, 1939   2 Sheets-Sheet 1

Inventor
Louis H. Rezos
By J. Preston Swecker
his Attorney

Aug. 11, 1942.    L. H. REZOS    2,292,480
SANITARY MEAT HOLDER.
Filed Sept. 21, 1939    2 Sheets-Sheet 2
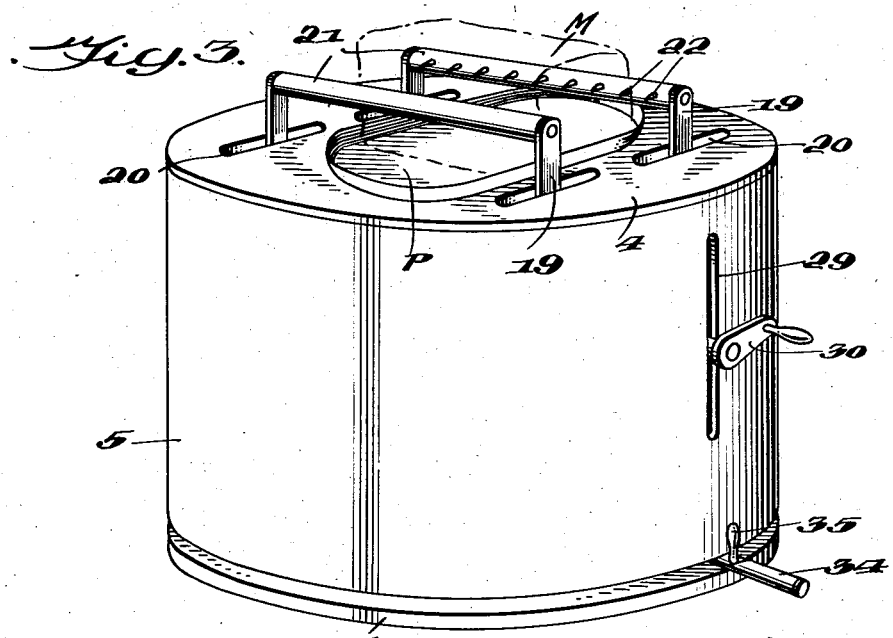
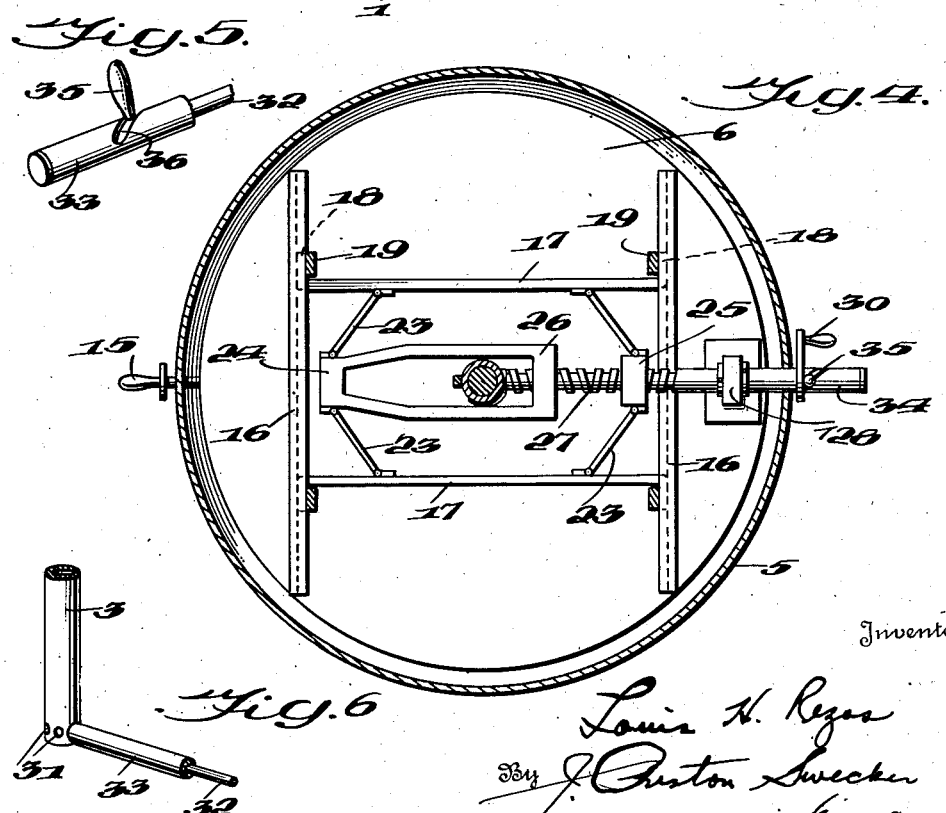
Inventor
Louis H. Rezos
By J. Preston Swecker
his Attorney Patented Aug. 11, 1942

2,292,480

UNITED STATES PATENT OFFICE 2,292,480

SANITARY MEAT HOLDER

Louis H. Rezos, Arlington, Va., assignor of one-half to Willis S. Warren and Annie H. Warren, jointly, Washington, D. C.

Application September 21, 1939, Serial No. 295,983

7 Claims. (Cl. 146—216)

This invention relates to an improvement in sanitary meat holders adapted to support a piece of meat in position for slicing and to hold the same securely during the slicing operation.

Heretofore, it has been customary to provide for the slicing of meat without securing the same in a fixed position or with only such holding thereof as is provided by a fork held in one hand of the operator while the knife is manipulated with the other for accomplishing the slicing operation. This is insufficient to hold the meat in place and is dangerous because of the tendency of the knife to slip and cut the hand that is holding the meat.

The object of this invention is to provide for the secure holding of a piece of meat during the slicing operation without requiring the use of one hand of the operator for this purpose, and in a secure and effective manner.

A further object of the invention is to simplify and improve the manner of holding a piece of meat during slicing by mounting it in a holding device that is simple in construction, effective in use, and is sanitary inasmuch as the parts may be separated for thorough cleaning thereof.

I have embodied my invention in a preferred form which involves the use of a pair of clamps which engage a piece of meat on opposite sides and securely clamp the same in place during the slicing operation. Provision is made for applying power to the clamps to hold the same in place, and also for adjusting the clamps up and down relative to the piece of meat to engage the same at different points in the height thereof.

This enables the meat holder to be utilized for securing roasts of beef, hams, and other pieces of meat, securely in place during the slicing operation without danger to the operator, and it is applicable either to cooked meat such as may be served in restaurants, hotels, etc., or it may be used in butcher shops and other places where meat may be sliced in either raw or cooked condition.

The preferred embodiment of my invention is illustrated in the accompanying drawings, in which:

Fig. 3 is a perspective view of the complete holder;

Fig. 4 is a horizontal sectional view therethrough on the line 4—4 of Fig. 1;

Fig. 5 is a detail perspective view of the outer end portion of the cover adjusting means; and Fig. 6 is a similar view of the inner end portion thereof.

Figure 1:
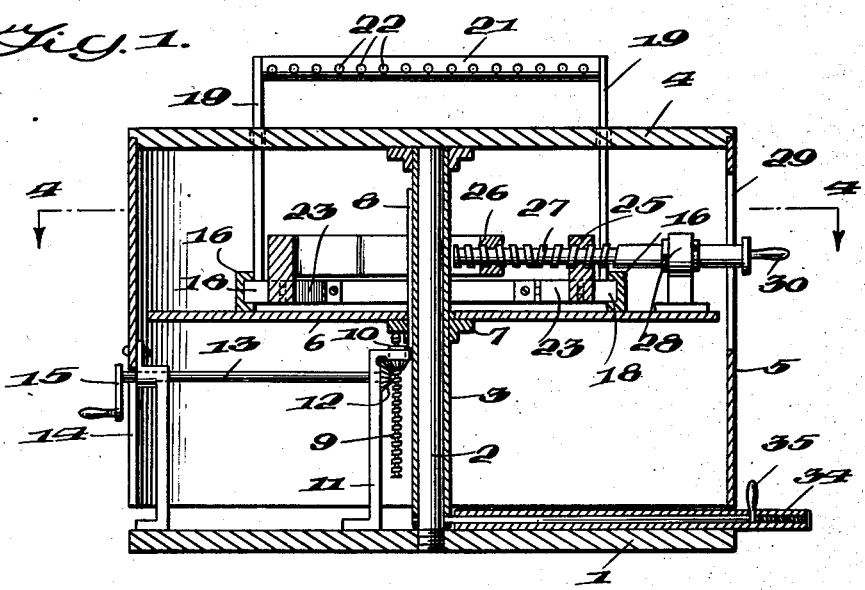
Fig. 1 is a vertical sectional view through my improved meat holder.

This meat holder is adapted to be mounted in any desired position for use, for which purpose it is provided with a base 1 from which a standard 2 stands upwardly therefrom at the center of the base, the latter being preferably circular. The standard 2 carries a sleeve 3 journaled thereon and to the upper end of which is secured a cover 4 which bears upon the upper end of the standard 2 and is supported thereby free for turning movement about the standard. The cover 4 has a depending surrounding housing 5 carried thereby which extends downward to a point adjacent the base 1 and adapted to be turned relative thereto.

A platform 6 is located within the housing 5 and has a hub 7 secured thereto about the sleeve 3, being keyed at 8 to the sleeve for turning movement therewith while it is free to slide lengthwise relative to the sleeve. The hub 7 is supported by one end of a screw 9, as shown in Fig. 1, which screw has said end bearing against the underside of the hub 7 permitting turning movement of the hub relative thereto. The screw 9 is supported in a nut 10 journaled in a bracket 11, which nut is geared at 12 to a shaft 13 that extends laterally through a slot 14 in the housing 5 and has a crank 15 on the outer end thereof for rotating the shaft manually. Upon rotation of the shaft 13, the nut 10 is turned to feed the screw 9 lengthwise and thereby raise or lower the hub 7 and platform 6 relative to the sleeve 3.

Figure 2:
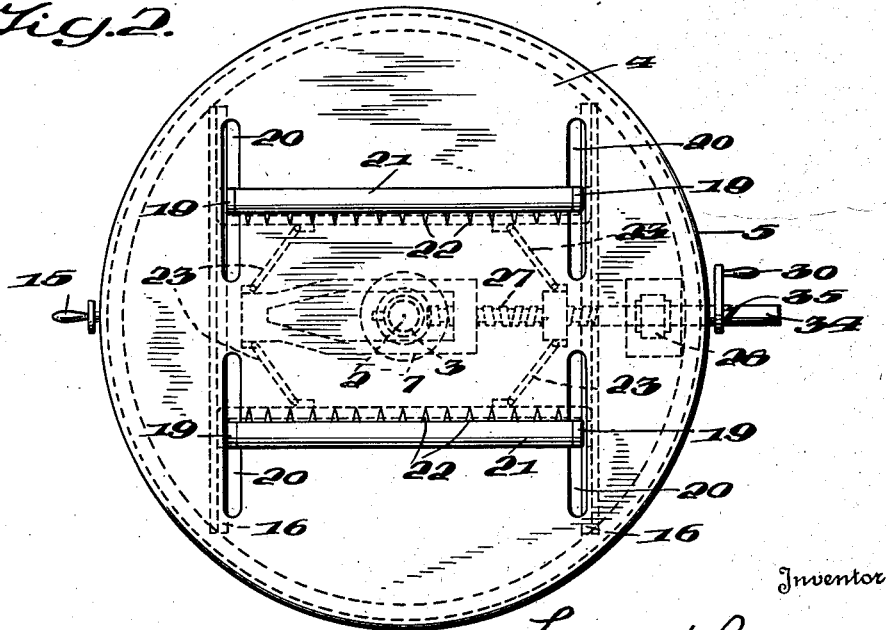
Fig. 2 is a top plan view thereof.

As shown in Fig. 4, the platform 6 has guides 16 on opposite sides of the sleeve 3, which guides extend transversely in parallel relation with grooves in the facing sides thereof. Bars 17 extend between the guides 16 and have out-turned ends 18 slidably mounted in the grooves of the guides. The ends 18 of each bar 17 support upstanding arms 19 that extend through slots 20 in the cover 4, as shown in Fig. 2, and the upper ends of the arms 19 carry a clamp 21 therebetween in bridging relation as shown in Figs. 2 and 4. The clamp is provided preferably with prongs 22 on the inner side thereof to engage in the meat.

For adjusting the clamps 21 toward and from each other and for securing the meat therebetween, the bars 17 are moved back and forth in the guides 16, by corresponding inward and outward movements of the respective bars, thereby moving the clamps toward and from each other.

For this purpose the bars 17 are pivotally connected with toggle links 23, the opposite ends of which toggle links are pivotally connected respectively at the opposite ends of the bars with a nut yoke 24 at one end thereof and with a coupling nut 25 at the opposite end. The yoke 24 embraces the sleeve 3 and has a nut 26 on the same side of the sleeve as the coupling nut 25. The nuts 25 and 26 are threaded on a screw shaft 27, having opposed right hand and left hand threaded portions engaged respectively by the nuts so that rotation of the shaft in one direction will act to move the nuts 25 and 26 toward and from each other, effecting corresponding movement of the bars 17. The shaft 27 is journaled in a bearing 28 supported on the platform 6, and extends through a slot 29 in the housing 5, with a crank 30 on the free end of said shaft for turning the same.

Thus it will be evident that the clamps 21 may be adjusted to engage pieces of meats of different sizes, and by raising and lowering the platform 6 through the operation of the crank 15, the clamps may be caused to engage the meat at different points in the height thereof. As indicated in Fig. 3 in dotted lines, a piece of meat would be located between the clamps 21, over the cover 4, a suitable pan or receptacle P being provided on the cover for supporting the meat M or to underlie the same.

Provision is made also for rotating the meat so as to present different sides thereof to the operator, for which purpose the cover and housing are rotatable journaled on the standard 2. The lower end portion of the sleeve 3 is provided with orifices 31 therein in position for selective engagement by a bolt 32 slidably mounted in a tube 33 and extending therein to a point externally of the housing 5. The bolt 32 is normally pressed inward by a coiled spring 34 mounted in the tube 33. The outer end of the bolts 32 carries a pin 35 which extends through a spiral slot 36 in the tube 33, as shown in Fig. 5, whereby turning movement of the pin 35 causes the same to move backward relative to the sleeve and withdrawn the bolt 32 from the corresponding orifice 31 in the sleeve 3, and thereby permit relation of the sleeve and cover relative to the standard end base, after which, the pin 35 may be released and the spring 34 will then force the bolt 32 into a selected one of the orifice 31, locking the parts in their adjusted positions.

The removable mounting of the sleeve 3 on the standard 2, permits said sleeve and its connected parts to be withdrawn from the base for thorough cleaning thereof, as may be required. The structure may be separated to the desired and necessary extent for a thorough cleaning of all of the parts, whereby it will be entirely sanitary in use.

I claim:

1. In a meat holder, the combination of clamps in position for engaging a piece of meat therebetween, supports for said clamps, toggle links connecting the supports together in pairs, each pair of toggle links having a nut connected therewith, and a shaft having oppositely threaded portions thereon engaging the respective nuts for moving the same in opposite directions upon rotation of the shaft to move the clamps toward and from each other.

2. In a meat holder, the combination of a platform having guideways extending transversely thereof in parallel relation, bars extending transversely between the guideways in parallel relation and having slides thereon mounted in the guideways, arms carried by the bars in upstanding positions, and clamps carried by the arms in position for engaging a piece of meat therebetween.

3. In a meat holder, the combination of a platform having guideways extending transversely thereof in parallel relation, bars extending transversely between the guideways in parallel relation and having slides thereon mounted in the guideways, arms carried by the bars in upstanding positions, clamps carried by the arms in position for engaging a piece of meat therebetween, toggle links connecting the bars together in pairs, each pair of toggle links having a nut connected therewith, and a shaft having oppositely threaded portions thereon engaging the respective nuts for moving the same in opposite directions upon rotation of the shaft to move the bars and connected clamps toward and from each other.

4. In a meat holder, the combination of a platform having guideways extending transversely thereof in parallel relation, bars extending transversely between the guideways in parallel relation and having slides thereon mounted in the guideways, arms carried by the bars in upstanding positions, clamps carried by the arms in position for engaging a piece of meat therebetween, toggle links connecting the bars together in pairs, each pair of toggle links having a nut connected therewith, a shaft having oppositely threaded portions thereon engaging the respective nuts for moving the same in opposite directions upon rotation of the shaft to move the bars and connected clamps toward and from each other, means for raising and lowering the platform, and a shaft geared to said raising and lowering means for operating the same.

5. In a meat holding device of the character described, the combination of a base having an upstanding standard thereon, a cover having a depending sleeve journaled on the standard for supporting the cover thereon and for rotary movement relative thereto, said cover having a meat-holding surface at the top thereof, and means above the cover and supported by the standard for holding a piece of meat in position on said meat holding surface.

6. In a meat holding device of the character described, the combination of a base having an upstanding standard thereon, a cover having a depending sleeve journaled on the standard for supporting the cover thereon and for rotary movement relative thereto, said cover having a meat holding surface at the top thereof, means above the cover and supported by the standard for holding a piece of meat in position on said meat-holding surface said cover having a depending surrounding housing carried thereby, and means for engaging the sleeve for securing the cover against turning movement.

7. In a meat holding device of the character described, the combination of a base having an upstanding standard thereon, a cover having a sleeve journaled on the standard for supporting the cover thereon, meat holding clamps mounted on the sleeve above the cover and movable toward and from each other, and means for raising and lowering the clamps relative to the cover.

LOUIS H. REZOS.